United States Patent
Tanaka et al.

(10) Patent No.: US 10,452,258 B2
(45) Date of Patent: Oct. 22, 2019

(54) VEHICULAR INPUT DEVICE AND METHOD OF CONTROLLING VEHICULAR INPUT DEVICE

(71) Applicant: TOYOTA JIDOSHA KABUSHIKI KAISHA, Toyota-shi, Aichi-ken (JP)

(72) Inventors: Seiichi Tanaka, Toyota (JP); Takahiro Hirota, Okazaki (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/875,645

(22) Filed: Jan. 19, 2018

(65) Prior Publication Data

US 2018/0210623 A1  Jul. 26, 2018

(30) Foreign Application Priority Data

Jan. 23, 2017  (JP) ................ 2017-009863

(51) Int. Cl.
*G06F 3/0488* (2013.01)
*B60K 35/00* (2006.01)
(Continued)

(52) U.S. Cl.
CPC ............ *G06F 3/0488* (2013.01); *B60K 35/00* (2013.01); *B60K 37/06* (2013.01); *G01C 21/3664* (2013.01); *G06F 3/03547* (2013.01); *G06F 3/0482* (2013.01); *G06F 3/04812* (2013.01); *G06F 3/04817* (2013.01); *G06F 3/04842* (2013.01); *G06F 3/04883* (2013.01);
(Continued)

(58) Field of Classification Search
CPC . G06F 3/04812; G06F 3/04842; G06F 3/0488
See application file for complete search history.

(56) References Cited

U.S. PATENT DOCUMENTS

2012/0194545 A1   8/2012  Shibata et al.
2012/0216150 A1*  8/2012  Wernecke ............ G06F 3/0481
                                                              715/850
(Continued)

FOREIGN PATENT DOCUMENTS

JP    S63240613 A    10/1988
JP    H07-160416 A    6/1995
(Continued)

*Primary Examiner* — Laurence J Lee
(74) *Attorney, Agent, or Firm* — Hunton Andrews Kurth LLP

(57) ABSTRACT

A vehicular input device includes a position detection unit that is disposed within a vehicle cabin, has an operative input surface on which a user performs an operative input, and detects a position of the operative input performed on the operative input surface; a display unit that is disposed within the vehicle cabin; and an ECU configured to display a selection image in an overlaid manner on an object within the display unit in a position corresponding to the position of the detected operative input when the position detection unit detects the operative input. The selection image is used to select the object within the display unit. The ECU highlights the selection image displayed on the display unit when the position of the operative input is detected by the position detection unit, further than when the position of the operative input is not detected by the position detection unit.

10 Claims, 8 Drawing Sheets

(51) Int. Cl.
*G01C 21/36* (2006.01)
*G06F 3/0489* (2013.01)
*G06F 3/0482* (2013.01)
*G06F 3/0354* (2013.01)
*B60K 37/06* (2006.01)
*G06F 3/0481* (2013.01)
*G06F 3/0484* (2013.01)
*G06F 3/147* (2006.01)

(52) U.S. Cl.
CPC .......... *G06F 3/04895* (2013.01); *G06F 3/147* (2013.01); *B60K 2370/1438* (2019.05)

(56) References Cited

U.S. PATENT DOCUMENTS

| | | | |
|---|---|---|---|
| 2013/0283185 A1* | 10/2013 | Mock | G06Q 10/103 |
| | | | 715/746 |
| 2015/0205943 A1* | 7/2015 | Takenaka | G06F 3/04883 |
| | | | 726/17 |
| 2016/0342406 A1 | 11/2016 | Ahmed et al. | |
| 2016/0378295 A1 | 12/2016 | Cousins | |

FOREIGN PATENT DOCUMENTS

| | | |
|---|---|---|
| JP | 2007-164695 A | 6/2007 |
| JP | 2012160079 A | 8/2012 |
| WO | 2016018331 A1 | 2/2016 |

* cited by examiner

FIG. 3

| DISPLAY MODE | IMAGE DATA | COORDINATE DATA | CURSOR IMAGE | HIGHLIGHTED CURSOR IMAGE |
|---|---|---|---|---|
| MAIN MENU | Image_001 | f001(X,Y) | Image_101 | Image_201 |
| MAIN MENU | Image_002 | f002(X,Y) | ... | ... |
| ... | ... | ... | ... | ... |
| TELEPHONE | Image_011 | f011(X,Y) | Image_111 | Image_211 |
| ... | Image_012 | f012(X,Y) | ... | ... |
| ... | ... | ... | ... | ... |
| AIR CONDITIONER | Image_021 | f021(X,Y) | Image_121 | Image_221 |
| ... | Image_022 | f022(X,Y) | ... | ... |
| ... | ... | ... | ... | ... |
| ... | ... | ... | ... | ... |
| ... | ... | ... | ... | ... | ns
VEHICULAR INPUT DEVICE AND METHOD OF CONTROLLING VEHICULAR INPUT DEVICE

INCORPORATION BY REFERENCE

The disclosure of Japanese Patent Application No. 2017-009863 filed on Jan. 23, 2017 including the specification, drawings and abstract is incorporated herein by reference in its entirety.

BACKGROUND

1. Technical Field

The present disclosure relates to a vehicular input device and a method of controlling a vehicular input device.

2. Description of Related Art

In the related art, a mouse having an internal switch that detects a person touching the mouse with a hand is known as an input device providing an input into a computer. The detection output of the internal switch is delivered to a CPU, and the CPU changes a method of displaying a cursor or the position of the cursor according to the detection output. The CPU stops unnecessary display of the cursor when the CPU determines that the mouse is not being used, based on the detection output. When the CPU determines that the use of the mouse is resumed, the CPU changes at least one of the shape, size, color, tone, blinking or unblinking, and blink cycle of the cursor to make the current position of the cursor easily identified (refer to, for example, Japanese Unexamined Patent Application Publication No. 07-160416 (JP 07-160416 A)).

SUMMARY

As described above, the input device (mouse) in the related art does not display the cursor when a user's hand is not touching the mouse. Thus, when the user touches the input device again, the cursor is displayed again, and the user recognizes the cursor again. The user operates the input device to move the cursor to a target position. The input device is used by being connected to a desktop personal computer (PC) or a laptop PC.

Unlike the input device for the PC, an input device that operates an electronic device mounted in a vehicle may need to be operated unexpectedly, and operation of the input device tends to be desirably completed in a short time period. Thus, for the input device of which the cursor (selection image) is not displayed, it takes time to recognize the cursor again, and the input device is not suitable for use in the vehicle. In addition, when the cursor (selection image) is not displayed, the cursor (selection image) may be lost out of sight.

The cursor (selection image) may also be lost out of sight at the time of operating the input device since the input device may not be recognized as easily as the input device connected to the PC.

When the cursor (selection image) is displayed in a highlighted manner at all times in order to make the cursor (selection image) easily recognized, the user draws attention to the highlighted cursor and is unlikely to promptly recognize the entire display.

The present disclosure provides a vehicular input device that enables a selection image to be promptly recognized while the entire display is easily recognized, and a method of controlling a vehicular input device.

A first aspect of the present disclosure relates to a vehicular input device including a position detection unit that is disposed within a vehicle cabin, has an operative input surface on which a user performs an operative input, and is configured to detect the position of the operative input performed on the operative input surface; a display unit that is disposed within the vehicle cabin; and an electronic control unit. The electronic control unit is configured to display a selection image on the display unit in an overlaid manner on an object that is within the display unit in a position corresponding to the position of the operative input detected by the position detection unit. The selection image is an image used to select any one of a plurality of objects displayed within the display unit. The electronic control unit is configured to highlight the selection image displayed on the display unit when the position of the operative input is detected by the position detection unit, further than when the position of the operative input is not detected by the position detection unit.

According to the first aspect of the present disclosure, the selection image is displayed at all times on the display unit. When the position of the operative input is detected, the selection image is displayed in an overlaid manner on the object that is within the display unit in a position corresponding to the position of the operative input. When the operative input is not detected, the selection image is not highlighted, and an object that is adjacent to the object displayed with the overlaid selection image is easily seen. When the operative input is detected, the selection image is highlighted, and the selected object is more easily seen.

Accordingly, a vehicular input device that enables a selection image to be promptly recognized while the entire display is easily recognized can be provided.

In the vehicular input device according to the first aspect of the present disclosure, the electronic control unit may be configured to highlight the selection image displayed on the display unit by changing the transparency, color, brightness, or contrast of the selection image.

According to the first aspect of the present disclosure, the selection image is highlighted by changing the transparency, color, brightness, or contrast of the selection image. Thus, the user can promptly recognize the highlighted selection image.

Accordingly, a vehicular input device that enables a selection image highlighted with transparency, color, brightness, or contrast to be promptly recognized while the entire display is easily recognized can be provided.

In the vehicular input device according to the first aspect of the present disclosure, the electronic control unit may be configured to highlight the selection image displayed on the display unit while maintaining the size of the selection image to be constant.

According to the first aspect of the present disclosure, the ability to easily recognize the selection image and the entire display can be improved by maintaining the size of the selection image to be constant.

Accordingly, a vehicular input device that enables a selection image to be promptly recognized while the entire display is easily recognized can be provided.

In the vehicular input device according to the first aspect of the present disclosure, the electronic control unit may be configured to highlight the selection image displayed on the display unit by displaying a predetermined animation inside the selection image.

According to the first aspect of the present disclosure, the selection image can be highlighted by using an animation (moving image).

Accordingly, a vehicular input device that enables a selection image to be promptly recognized by using an animation while the entire display is easily recognized can be provided.

In the vehicular input device according to the first aspect of the present disclosure, the electronic control unit may be configured to display the selection image with a different color from the object in a position overlapping with the entirety of the object, and display the selection image such that the transparency of the selection image with which the object is seen through is lower in an end portion of the selection image than in a center portion of the selection image.

According to the first aspect of the present disclosure, the transparency of the selection with which the object is seen through is lower in the end portion of the selection image than in the center portion of the selection image. Thus, the center portion of the selection image does not block the display of the object.

Accordingly, a vehicular input device that enables a selection image to be promptly recognized by displaying an object in a center portion of the selection image while the entire display is easily recognized can be provided.

In the vehicular input device according to the first aspect of the present disclosure, the selection image may be a cursor that indicates that the object is selected.

According to the first aspect of the present disclosure, selection of the object can be easily recognized by using the cursor as the selection image with which the object is selected.

Accordingly, a vehicular input device that enables a cursor to be promptly recognized while the entire display is easily recognized can be provided.

In the vehicular input device according to the first aspect of the present disclosure, the position detection unit may be a touchpad, and the display unit may be a display.

A second aspect of the present disclosure relates to a method of controlling a vehicular input device including a position detection unit that is disposed within a vehicle cabin, has an operative input surface on which a user performs an operative input, and is configured to detect the position of the operative input performed on the operative input surface; a display unit that is disposed within the vehicle cabin; and an electronic control unit configured to display a selection image in an overlaid manner on an object within the display unit in a position corresponding to the position of the detected operative input when the position detection unit detects the operative input. The selection image is used to select the object within the display unit. The method of controlling a vehicular input device includes, by the electronic control unit, highlighting the selection image displayed on the display unit when the position of the operative input is detected by the position detection unit, further than when the position of the operative input is not detected by the position detection unit.

According to the second aspect of the present disclosure, the selection image is displayed at all times on the display unit. When the position of the operative input is detected, the selection image is displayed in an overlaid manner on the object that is within the display unit in a position corresponding to the position of the operative input. When the operative input is not detected, the selection image is not highlighted, and an object that is adjacent to the object displayed with the overlaid selection image is easily seen. When the operative input is detected, the selection image is highlighted, and the selected object is more easily seen.

Accordingly, a method of controlling a vehicular input device that enables a selection image to be promptly recognized while the entire display is easily recognized can be provided.

A third aspect of the present disclosure relates to a vehicular input device including a position detection unit that is disposed within a vehicle cabin, has an operative input surface on which a user performs an operative input, and is configured to detect the position of the operative input performed on the operative input surface; a display unit that is disposed within the vehicle cabin; and an electronic control unit. The electronic control unit is configured to display a selection image on the display unit in an overlaid manner on an object that is the display unit in a position corresponding to the position of the operative input detected by the position detection unit within the display unit. The selection image is an image used to select any one of a plurality of objects displayed within the display unit. The electronic control unit is configured to highlight the selection image displayed on the display unit at a first intensity level or a second intensity level. The first intensity level is greater than the second intensity level. The first intensity level is selected when the position of the operative input is detected by the position detection unit, and the second intensity level is selected when the position of the operative input is not detected by the position detection unit. The first intensity level and the second intensity level indicate level of transparency color, brightness or contrast of the selection image.

According to the first, second and third aspects of the present disclosure, a vehicular input device that enables a selection image to be promptly recognized while the entire display is easily recognized, and a method of controlling a vehicular input device can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram illustrating data that is used when a DCU displays a GUI operator and an image of a cursor on a display panel;

DETAILED DESCRIPTION OF EMBODIMENTS

Hereinafter, an embodiment to which a vehicular input device and a method of controlling a vehicular input device of the present disclosure are applied will be described.

Embodiment

Figure 1:
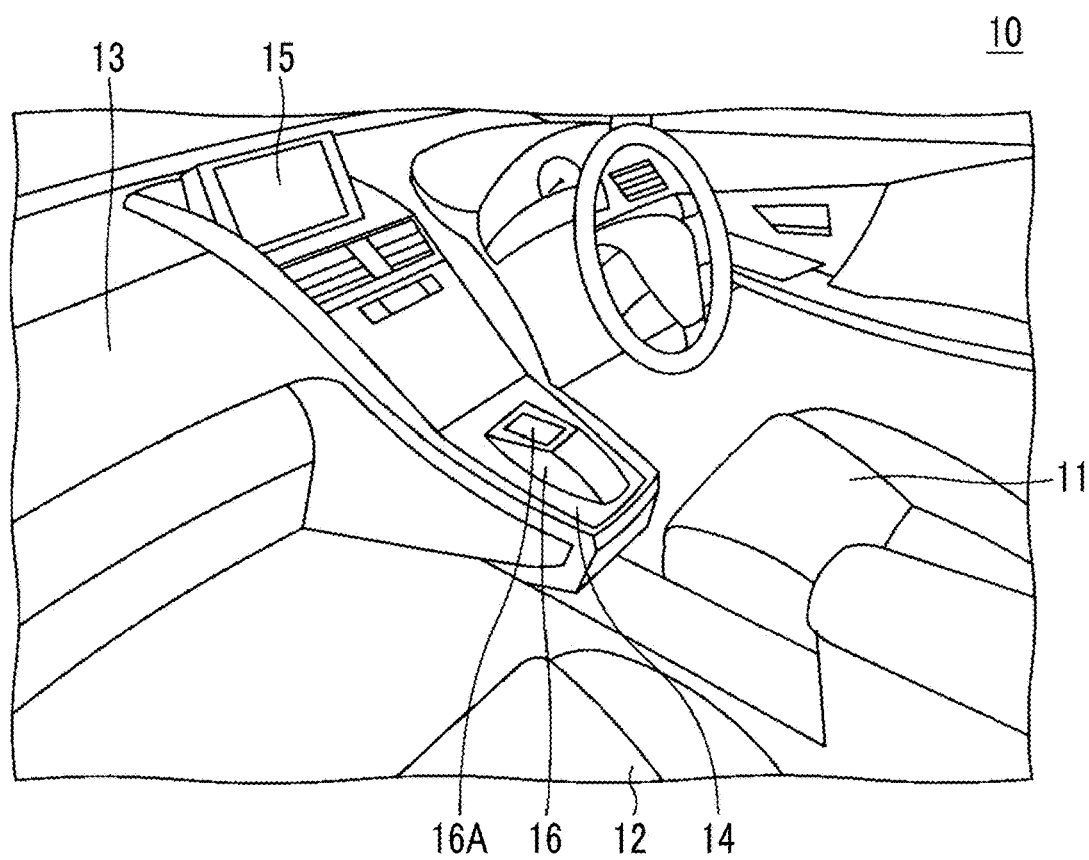
FIG. 1 is a diagram illustrating an interior of a vehicle to which a vehicular input device of an embodiment is applied.

FIG. 1 is a diagram illustrating the interior of a vehicle 10 to which the vehicular input device of the embodiment is applied. A dashboard 13 is disposed in front of a driver's seat 11 and a passenger seat 12 in the interior of the vehicle 10. A center console 14 is disposed across a space from the center of the dashboard 13 to the driver's seat 11 and the passenger seat 12.

A display panel 15 is disposed at the center of the dashboard 13. An input unit 16 is disposed in front of the center console 14 (a side of the center console 14 closer to the dashboard 13). The input unit 16 has a touchpad 16A.

The display panel 15 is, for example, a liquid crystal panel and may be other types of display panels than a liquid crystal panel. The display panel 15 can display various screens such as a screen for a navigation system, a screen for setting a traveling mode or the like of the vehicle, a screen for setting an air conditioner, an audio operating screen, and a telephone operating screen.

The touchpad 16A is, for example, a capacitive or resistive type and detects the position (coordinates) where a user touches the surface of the touchpad 16A with a fingertip, a hand, or the like. The touchpad 16A is used when the user selects a cursor displayed on various screens displayed on the display panel 15. The operation of the user touching the surface of the touchpad 16A with a fingertip, a hand, or the like in order to provide an input will be referred to as an operative input.

The vehicular input device of the embodiment includes the display panel 15 and the input unit 16. The movement direction and the movement amount of the operative input performed on the touchpad 16A are associated with the movement direction and the movement amount of the cursor in the display panel 15.

When the user performs the operative input on the touchpad 16A with a fingertip, a hand, or the like, the cursor displayed on the display panel 15 is moved. The cursor is used at the time of selecting various objects such as a graphic user interface (GUI) operator. Examples of the GUI operator include, for example, a button, a slider, and a dial.

A display surface of the display panel 15 has a rectangular shape, and an operating screen of the touchpad 16A also has a rectangular shape. The movement direction of the cursor is configured to match the movement direction of the operative input performed on the touchpad 16A by the user. When the position of the operative input is moved leftward, the cursor displayed on the display panel 15 is also moved leftward. When the position of the operative input is moved rightward, upward (forward of the vehicle), or downward (rearward of the vehicle), the cursor displayed on the display panel 15 is also moved rightward, upward, or downward respectively.

The cursor displayed on the display panel 15 can be moved with the operative input performed on the touchpad 16A. Various objects such as a GUI operator displayed on the display panel 15 can be selected by moving the cursor. The input provided on the selected object such as a GUI operator can be confirmed by, for example, pressing the touchpad 16A. The input provided by pressing is detected by, for example, a change in the area of the touch with the fingertip, the hand, or the like on the touchpad 16A.

Figure 2:
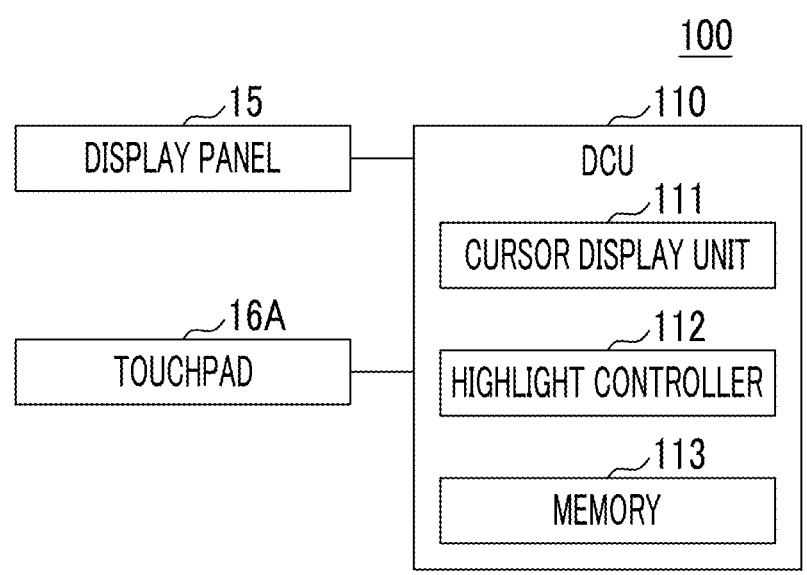
FIG. 2 is a diagram illustrating a configuration of the vehicular input device of the embodiment.

FIG. 2 is a diagram illustrating a configuration of a vehicular input device 100 of the embodiment. The vehicular input device 100 includes a display control unit (DCU) 110, the display panel 15, and the touchpad 16A. The display panel 15 is one example of a display unit, and the touchpad 16A is one example of a position detection unit. The surface of the touchpad 16A is one example of an operative input surface.

The DCU 110 is one kind of an electronic control unit (ECU) and is a control device that controls an image displayed on the display panel 15. The DCU 110 has a cursor display unit 111, a highlight controller 112 (one example of an electronic control unit), and a memory 113.

The DCU 110, in the same manner as various ECUs mounted in the vehicle 10, is realized by a computer including, for example, a central processing unit (CPU), a random access memory (RAM), a read-only memory (ROM), a non-volatile memory such as a hard disk, a clock generation unit, an input and output interface, a communication interface, a transmission and reception unit, and an internal bus.

The DCU 110 functions to display various images such as an operator for setting the traveling mode or the like of the vehicle, an air conditioner operator, and an audio operator, a telephone operator, and to receive the operative input of the user. The DCU 110 transmits an instruction indicated by the received operative input to various ECUs such as an ECU that sets the traveling mode or the like of the vehicle, and an ECU of the air conditioner. The DCU 110 performs control to display a GUI operator such as a GUI button and various images and the like of the GUI on the display panel 15 (display control). Such a function is realized by the function of the DCU 110 as a display controller.

The cursor display unit 111 displays the cursor on the display panel 15. The cursor is displayed in an overlaid manner on a GUI operator in order to specify or select an object such as a GUI operator displayed on the display panel 15. The cursor is one example of a selection image, and the cursor display unit 111 is one example of the electronic control unit.

When the vehicular input device 100 is powered, the cursor display unit 111 displays the cursor in a predetermined default position or in an overlaid manner on a predetermined default GUI operator or the like. When the touchpad 16A detects the position of the operative input, the cursor display unit 111 displays the cursor in an overlaid manner on a GUI operator that is in the detected position of the operative input.

The cursor display unit 111 moves the cursor within the display panel 15 when the operative input is performed on the touchpad 16A. Then, when the operative input is finished, the cursor that is displayed in an overlaid manner on the GUI operator or the like when the operative input is finished remains displayed in the position thereof.

When the touchpad 16A detects the position of the operative input, the highlight controller 112 highlights the cursor displayed on the display panel 15 by the cursor display unit 111 further than when the touchpad 16A does not detect the position of the operative input. In other words, the first intensity level is selected when the touchpad 16A detects the position of the operative input, the first intensity level is selected, and the second intensity level is selected when the touchpad 16A does not detect the position of the operative input. The first intensity level and the second intensity level may indicate level of transparency color, brightness or contrast of the selection image.

The position of the operative input is detected when the fingertip or the hand of the user is in contact with the touchpad 16A. The position of the operative input is not detected when the fingertip or the hand of the user is not in contact with the touchpad 16A. When the fingertip or the hand of the user is in contact with the touchpad 16A, it is possible that the user sees the display panel 15 and tries to recognize an object such as a GUI operator pointed with the cursor.

In such a case, in order to make the cursor recognized more easily, the vehicular input device 100 highlights the cursor when the fingertip or the hand of the user is in contact with the touchpad 16A.

The memory 113 stores image data that indicates objects of various types of GUI operators and the like (operators of the vehicle for setting the telephone operator, the air conditioner operator, the audio operator, the GUI operator indicating the traveling mode or the like of the vehicle, and the like) displayed on the display panel 15. The memory 113 is a non-volatile memory such as a hard disk.

FIG. 3 is a diagram illustrating data that is used when the DCU 110 displays a GUI operator and an image of the cursor on the display panel 15. The table-format data illustrated in FIG. 3 is data in which a display mode, image data, coordinate data, a cursor image, and a highlighted cursor image are associated with each other.

The display mode indicates a mode of display on the display panel 15. The display mode is, for example, a mode that displays any of an image of a main menu, an image of the telephone operator, an image of the air conditioner operator, an image of the audio operator, and an image of the operator for setting the traveling mode or the like of the vehicle.

The image data is data that indicates an image of a GUI operator, a background image, or the like displayed on the display panel 15 in each display mode. The coordinate data indicates the coordinates of a region in which each image data is displayed on the display panel 15.

The cursor image and the highlighted cursor image are respectively data indicating an image of a non-highlighted cursor and data indicating an image of a highlighted cursor. The cursor image and the highlighted cursor image are associated with the image data that indicates a GUI operator or the like which is a target of displaying a cursor 150. The cursor image and the highlighted cursor image are not associated with the image data that indicates a background image or the like which is not a target of displaying the cursor 150.

For example, image data Image_001 of the main menu of the display mode is associated with coordinate data f001(X, Y), a cursor image Image_101, and a highlighted cursor image Image_201. Image data Image_002 of the main menu of the display mode is associated with coordinate data f002(X,Y) and is not associated with the cursor image and the highlighted cursor image.

Figure 4A:
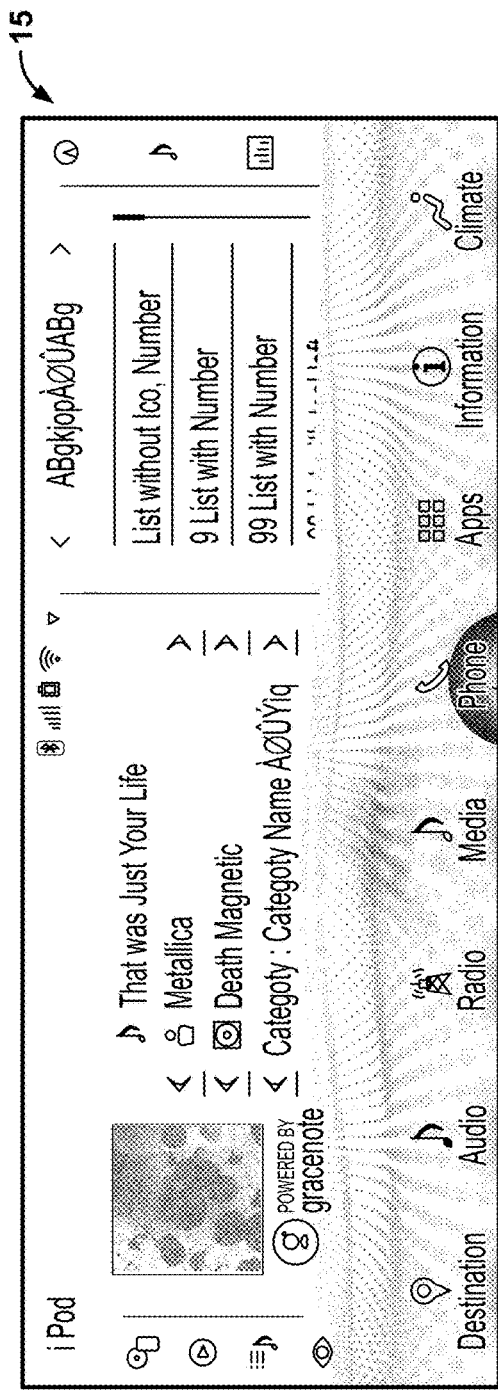
FIG. 4A is a diagram illustrating one example of the cursor.
Figure 4B:
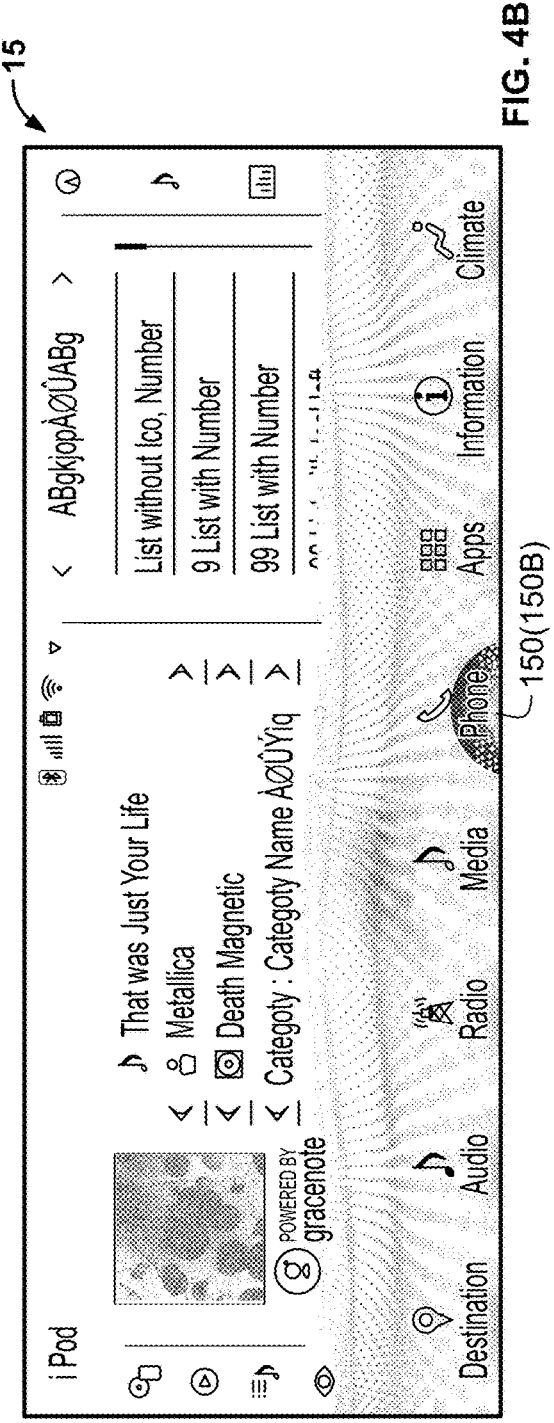
FIG. 4B is a diagram illustrating one example of the cursor.

FIGS. 4A and 4B are diagrams illustrating one example of the cursor. FIG. 4A illustrates a state in which the cursor 150 is not highlighted. FIG. 4B illustrates a state in which the cursor 150 is highlighted. Hereinafter, the cursor 150 that is not highlighted will be referred to as a cursor 150A, and the cursor 150 that is highlighted will be referred to as a cursor 150B. The term cursor 150 will be used unless the cursor 150A and the cursor 150B are distinguished from each other.

In FIG. 4A and FIG. 4B, GUI buttons of destination (Destination), audio (Audio), radio (Radio), media (Media), telephone (Phone), applications (Apps), information (Information), and air conditioner (Climate) are displayed on the lower side of the display panel 15. A song title and the like are displayed dimly on the upper side of the eight GUI buttons.

In FIG. 4A, the cursor 150A that is not highlighted points to the GUI button of telephone (Phone) among the eight GUI buttons in a state in which the operative input is not performed on the touchpad 16A. The cursor 150A points to a lower side part of the GUI button of telephone (Phone) more brightly. The GUI button of telephone (Phone) to which the cursor 150A points is displayed relatively brightly, and the other seven GUI buttons are displayed relatively dimly.

Each of the eight GUI buttons is configured with a combination of a mark and a text representing each function. For example, the GUI button of telephone (Phone) is configured with a telephone mark and the text Phone. The GUI button of air conditioner (Climate) is configured with a mark of a person on a seat and the text Climate.

A region that functions as each GUI button is a region that includes each mark and each text. For example, the GUI button of air conditioner (Climate) is a region that includes a mark of a person on a seat and the text Climate, and has a rectangular shape. The same applies to the other seven GUI buttons.

The mark and the text of each GUI button are not inversely displayed between a state not selected with the cursor 150A (the cursor 150A is not overlaid) and a state selected with the cursor 150A (the cursor 150A is overlaid), and the brightness of the mark and the text of each GUI button is changed.

The cursor 150A points to each GUI button brightly in red having high brightness. The transparency of the cursor 150A is set such that the mark and the text of the GUI button are seen through the cursor 150A. The transparency is set to be increased toward the upper side of the GUI button, to approximately 100%, and is set to be gradually decreased toward the lower side of the GUI button. The transparency is approximately 0% at the lower end of the GUI button. The color of the cursor 150A is different from the color of each GUI button and the like other than the cursor 150A. The cursor 150A has, for example, the same size as each GUI button and is displayed in an overlaid manner on the entirety of the GUI button.

Thus, the cursor 150A is disposed to be overlaid on the lower side part of the GUI button of telephone (Phone) and allows the upper side of the GUI button of telephone (Phone) to be displayed. The cursor 150A points to the lower side of the GUI button brightly in red. The cursor 150A does not cover (hide) the entirety of the GUI button of telephone (Phone) (both of the telephone mark and the text Phone), and the cursor 150A is displayed on the lower side of the GUI button.

In FIG. 4B, the cursor 150B that is highlighted points to the GUI button of telephone (Phone) in a state in which the operative input is performed on the touchpad 16A. The cursor 150B is realized by overlaying two images, displaying the cursor 150A, on each other.

Thus, the transparency of the cursor 150B is increased toward the upper side to approximately 100%) and is gradually decreased (to approximately 0%) toward the lower side in the same manner as the cursor 150A. However, the transparency of the cursor 150B is half of the transparency of the cursor 150A in a part in which the transparency is higher than 0% and less than 100%. The cursor 150A and the cursor 150B have the same size (a pixel size of the rectangular region in which each of the cursors 150A, 150B is displayed). The size is maintained to be constant in order not to block the display of the other GUI buttons.

The cursor 150B is displayed such that the cursor 150A is increased upward. The cursor 150B is displayed with an animation, for example, a moving image, that represents an image of small bouncing bubbles (microbubbles).

Accordingly, in a state in which the user is not performing the operative input on the touchpad 16A, and the cursor 150A points to the GUI button of telephone (Phone) as illustrated in FIG. 4A, when the user performs the operative input on the touchpad 16A, the cursor 150B is displayed such that the cursor 150B spreads widely upward and is displayed with the animation of bouncing microbubbles as illustrated in FIG. 4B.

Accordingly, the user can visually recognize that the GUI button of telephone (Phone) to which the cursor 150B points is selected by the operative input performed on the touchpad 16A. The microbubbles are generated under the text Phone in FIG. 4B.

The cursors 150A, 150B may be repeatedly alternately displayed while the user performs the operative input. In such a case, the alternate display of the cursors 150A, 150B repeatedly changes the size of the cursor 150, and the cursor 150 can be further highlighted, for instance.

While the cursor 150A is switched to the cursor 150B by the user performing the operative input on the touchpad 16A in a state in which the user is not performing the operative input on the touchpad 16A, and the cursor 150A points to the GUI button of telephone (phone), the same applies to the other GUI buttons.

When the user selects each GUI button in order while performing the operative input on the touchpad 16A, the cursor 150B points to each GUI button in order.

Figure 5:
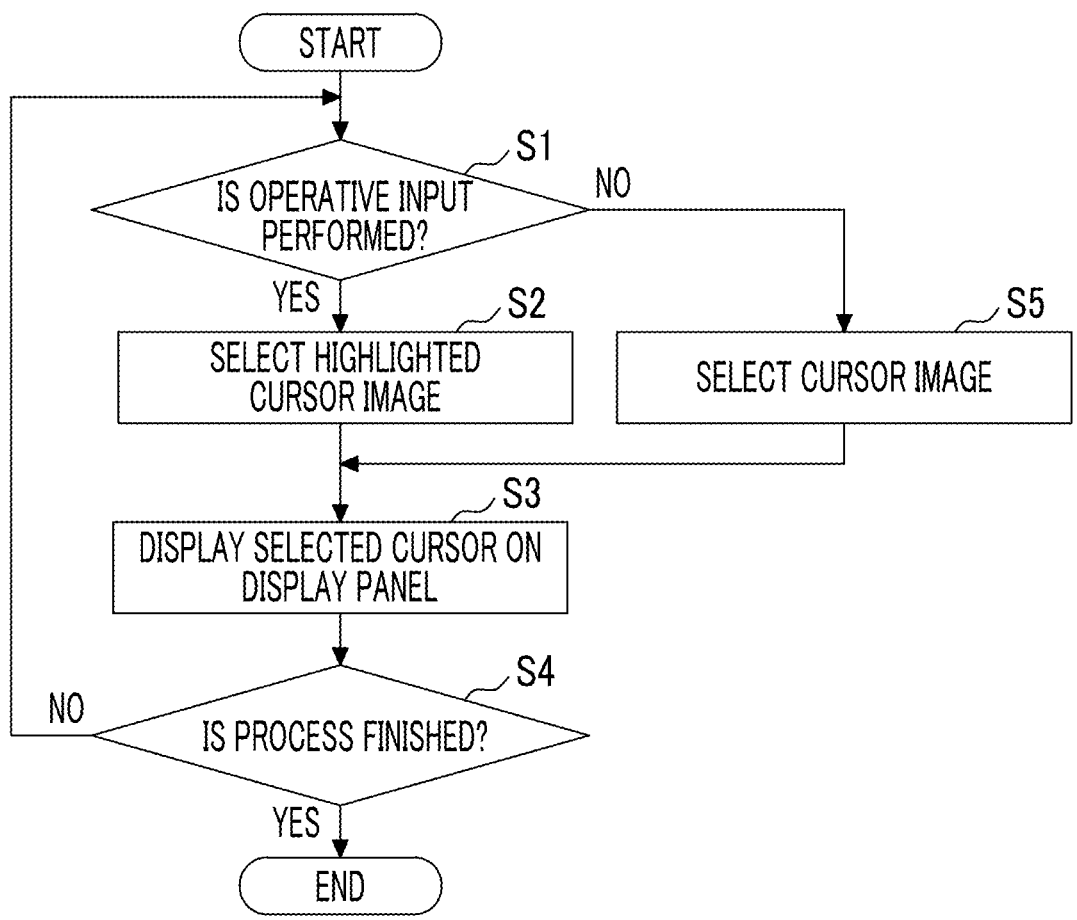
FIG. 5 is a flowchart illustrating a process executed by the DCU.

FIG. 5 is a flowchart illustrating a process executed by the DCU 110.

When an ignition switch of the vehicle is set to an ON state, the DCU 110 starts the process (START).

The highlight controller 112 determines whether or not the operative input is being performed (step S1). The determination as to whether or not the operative input is being performed may be performed based on a signal that is input into the DCU 110 from the touchpad 16A.

When the highlight controller 112 determines that the operative input is being performed (YES in S1), the highlight controller 112 selects the highlighted cursor image of the cursor 150B from the table-format data illustrated in FIG. 3 (step S2).

The cursor display unit 111 displays the highlighted cursor image of the cursor 150 selected by the highlight controller 112 on the display panel 15 (step S3).

The highlight controller 112 determines whether or not to finish the process (step S4). The process is finished when, for example, the ignition switch is set to an OFF state.

When the highlight controller 112 determines that the process is not finished (NO in S4), the flow of the process returns to step S1. When the highlight controller 112 determines that the process is finished (YES in S4), the highlight controller 112 finishes the series of processes (END).

When the highlight controller 112 in step S1 determines that the operative input is not being performed (NO in S1), the highlight controller 112 selects the cursor image of the cursor 150A from the table-format data illustrated in FIG. 3 (step S5). When the process of step S5 is finished, the flow transitions to step S3. Consequently, in step S3, the cursor image of the cursor 150A selected by the highlight controller 112 is displayed on the display panel 15.

Figure 6A:
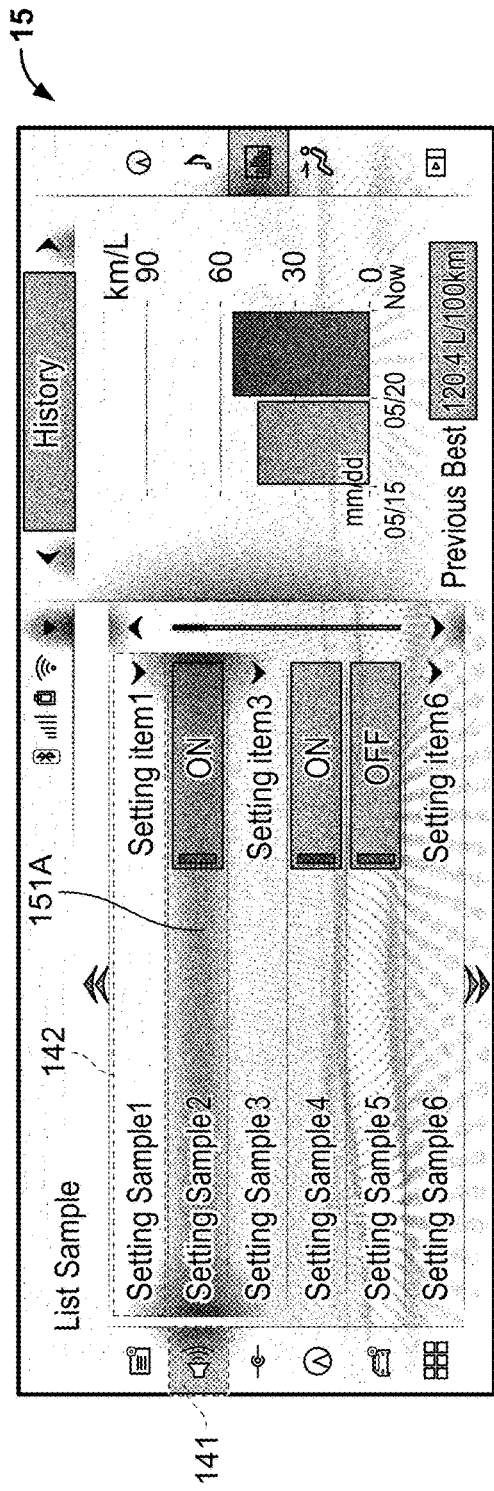
FIG. 6A is a diagram illustrating another example of the cursor.
Figure 6B:
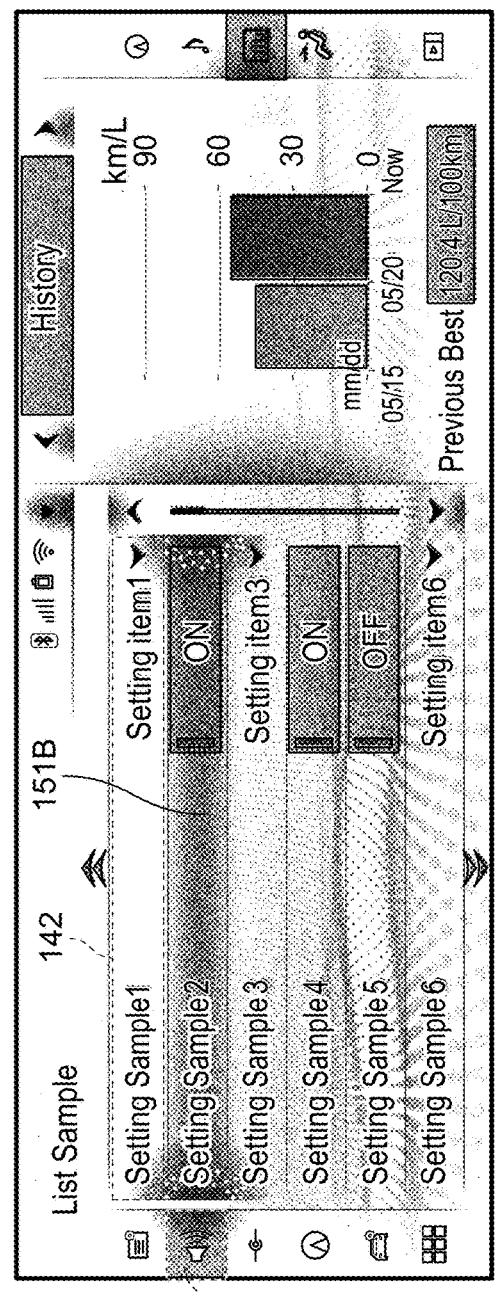
FIG. 6B is a diagram illustrating another example of the cursor.

FIGS. 6A and 6B are diagrams illustrating another example of the cursor 150. FIG. 6A illustrates a state in which the cursor 150 is not highlighted. FIG. 6B illustrates a state in which the cursor 150 is highlighted.

In FIG. 6A and FIG. 6B, six GUI buttons 141 for various settings are displayed on the left side of the display panel 15. Each GUI button 141 is illustrated by a mark and does not include a text.

In FIG. 6A, the second, from the top, GUI button 141 having a speaker mark is displayed more brightly than the other five GUI buttons 141, and indicates that a speaker setting mode is selected. In the speaker setting mode, six GUI buttons 142 (Setting Samples 1 to 6) are displayed. The six GUI buttons 142 (Setting Samples 1 to 6) are arranged in one vertical row, and are a list of a plurality of GUI buttons.

Each GUI button 142 is a GUI button having a horizontally long rectangular shape, and the types Setting Samples 1 to 6 are illustrated as a text on the left side of each GUI button 142. Setting Samples 1, 3, 6 among the GUI buttons 142 are configured to enable selection of a plurality of items (Setting items), and the selected content is displayed on the right side of Setting samples 1, 3, 6. For example, Setting items 1, 3, 6 are selected in Setting Samples 1, 3, 6 respectively. Each item (Setting item) can be selected by pressing on the touchpad 16A in a state in which the GUI button 142 of each of Setting Samples 1, 3, 6 is specified with a cursor 151A.

An ON/OFF state is displayed on the right side of Setting Samples 2, 4, 5 among the GUI buttons 142. The ON/OFF state can be switched by pressing on the touchpad 16A in a state in which the GUI button 142 of each of Setting Samples 2, 4, 5 is specified with the cursor 151A.

In the state illustrated in FIG. 6A, the operative input is not being performed on the touchpad 16A, and the cursor 151A that is not highlighted points to the second GUI button 142 (Setting Sample 2) from the top. The cursor 151A is displayed for the list of GUI buttons.

The cursor 151A has transparency that is set to be relatively low in both end parts of the horizontally long rectangular GUI button 142 (Setting Sample 2) not having the text, and is set to be increased toward the center from both ends. The cursor 151A has the same size as each GUI button 142 and is configured to have a lower transparency for seeing each GUI button 142 therethrough in end portions than in the center portion. The cursor 151A is displayed in an overlaid manner on each GUI button 142.

In such a state, when the operative input is performed on the touchpad 16A, display is switched such that a cursor 151B that is highlighted points to the second GUI button 142 (Setting Sample 2) from the top as illustrated in FIG. 6B. The cursor 151B is configured with two cursors 151A overlaid on each other. Accordingly, the regions having a low transparency on both ends are highlighted as being extended toward the center, compared to those with the cursor 151A.

Accordingly, the user can visually recognize that the GUI button 142 (Setting Sample 2) to which the cursor 151B points is selected by the operative input performed on the touchpad 16A. The cursor 151B is displayed with microbubbles.

The same applies when the other GUI buttons 142 (Setting Samples 1, 3 to 6) are selected.

Figure 7A:
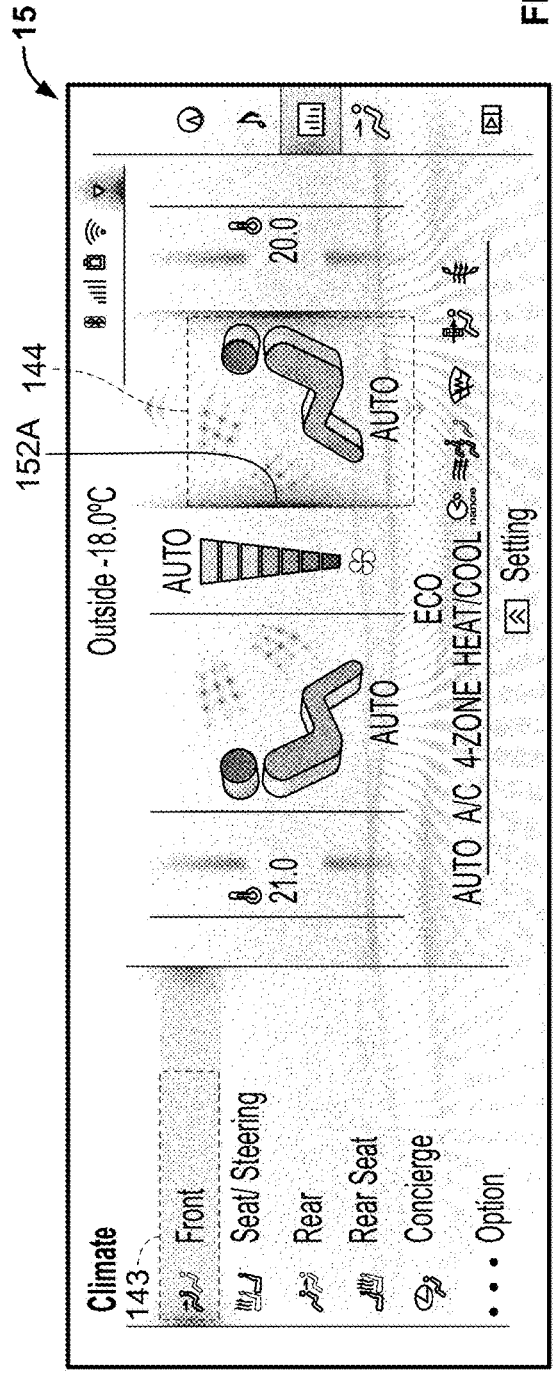
FIG. 7A is a diagram illustrating another example of the cursor.
Figure 7B:
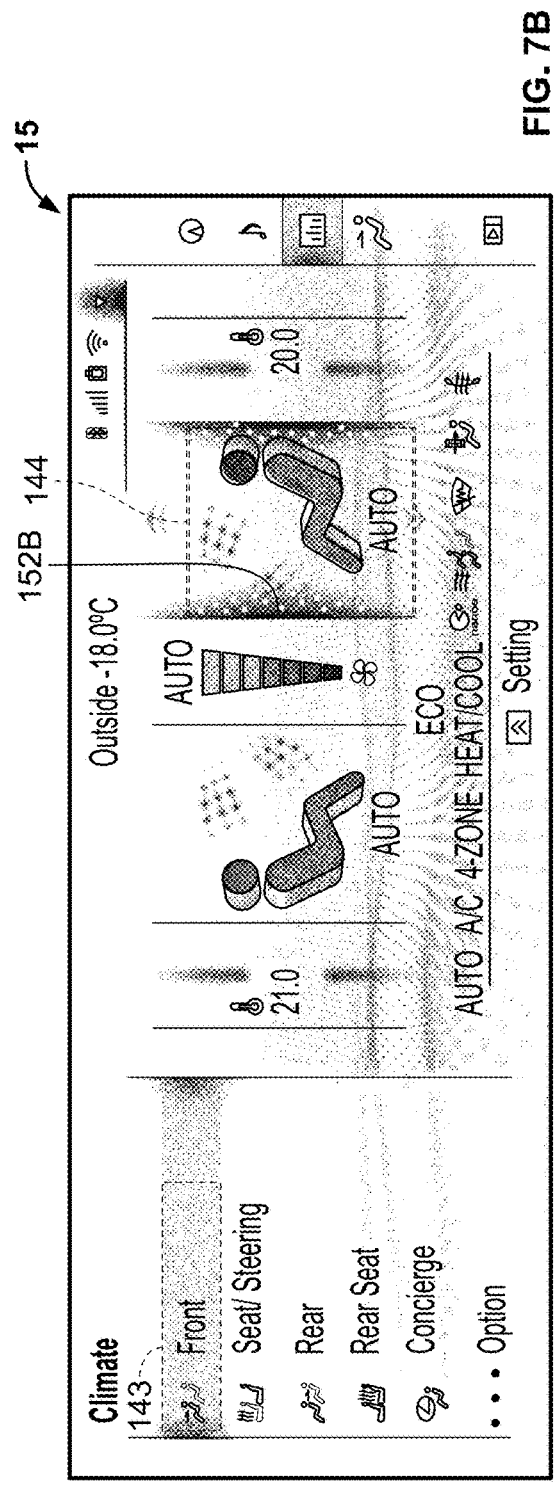
FIG. 7B is a diagram illustrating another example of the cursor.

FIGS. 7A and 7B are diagrams illustrating another example of the cursor 150. FIG. 7A illustrates a state in which the cursor 150 is not highlighted. FIG. 7B illustrates a state in which the cursor 150 is highlighted.

In FIG. 7A and FIG. 7B, six GUI buttons 143 for various settings of the air conditioner are displayed on the left side of the display panel 15. Each GUI button 143 is illustrated by a mark and a text. Specifically, in order from the top, the GUI buttons 143 indicate front air flow direction adjustment (Front), front seat and steering heaters (Seat/Steering), rear air flow direction adjustment (Rear), a rear seat heater (Rear Seat), concierge control (Concierge), and option (Option).

In FIG. 7A, the first GUI button 143 of front air flow direction adjustment (Front) from the top is displayed more brightly than the other five GUI buttons 143, and indicates that front air flow direction adjustment (Front) is selected. In a front air flow direction adjustment (Front) setting mode, a set temperature, the amount of air flow (Auto in FIG. 7A), and the like for a front left seat and a front right seat are displayed at the center and the right side of the display panel 15. Each of the set temperature, the amount of air flow, and the like for the front left seat and the front right seat is assigned a GUI button 144.

In the state illustrated in FIG. 7A, the operative input is not being performed on the touchpad 16A, and a cursor 152A that is not highlighted points to the GUI button 144 for selecting the front right seat.

The cursor 152A has transparency that is set to be relatively low on both ends of the GUI button 144 for selecting the front right seat, and is set to be increased toward the center from both ends.

In such a state, when the operative input is performed on the touchpad 16A, display is switched such that a cursor 152B that is highlighted points to the GUI button 144 (front right seat) as illustrated in FIG. 7B. The cursor 152B is configured with two cursors 152A overlaid on each other. Accordingly, the regions having a low transparency on both ends are highlighted as being extended toward the center, compared to those with the cursor 152A.

Accordingly, the user can visually recognize that the GUI button 144 (front right seat) to which the cursor 152B points is selected by the operative input performed on the touchpad 16A. The cursor 152B is displayed with microbubbles.

The same applies when the other GUI buttons 144 are selected.

Figure 8A:
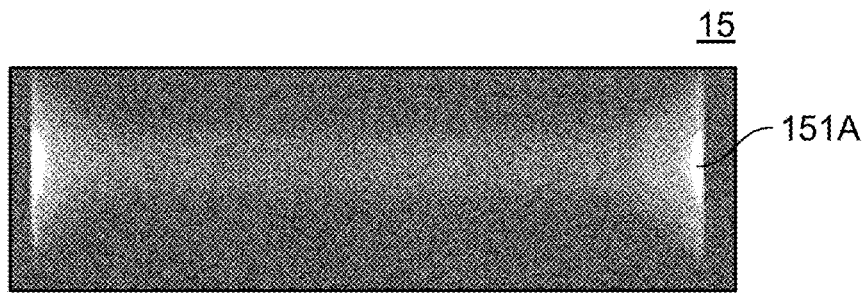
FIG. 8A is a diagram illustrating the cursor.
Figure 8B:
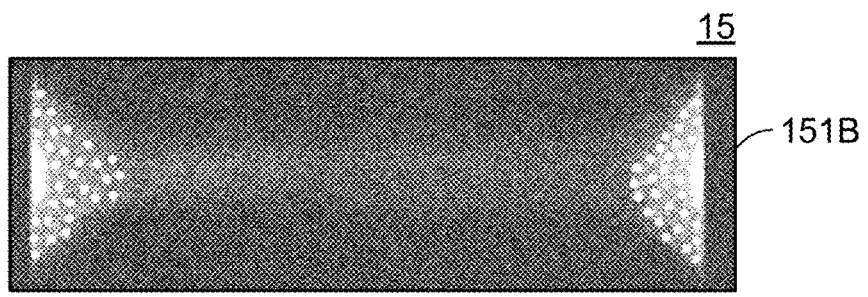
FIG. 8B is a diagram illustrating the cursor.

FIGS. 8A to 8D are diagrams illustrating the cursor. FIG. 8A and FIG. 8B respectively illustrate the cursors 151A, 151B that are displayed for the list of GUI buttons. The cursors 151A, 151B respectively illustrated in FIG. 8A and FIG. 8B are the cursors 151A, 151B taken out from FIG. 6A and FIG. 6B.

The cursor 151A illustrated in FIG. 8A has transparency that is set to be relatively low in both end parts of the cursor 151A, and is set to be increased toward the center from both ends. When the operative input is performed on the touchpad 16A, the cursor 151B that is highlighted is displayed as illustrated in FIG. 8B. The cursor 151B is configured with two cursors 151A overlaid on each other. Accordingly, the regions having a low transparency on both ends are highlighted as being extended toward the center, compared to those with the cursor 151A. The cursor 151B is displayed with microbubbles.

Figure 8C:
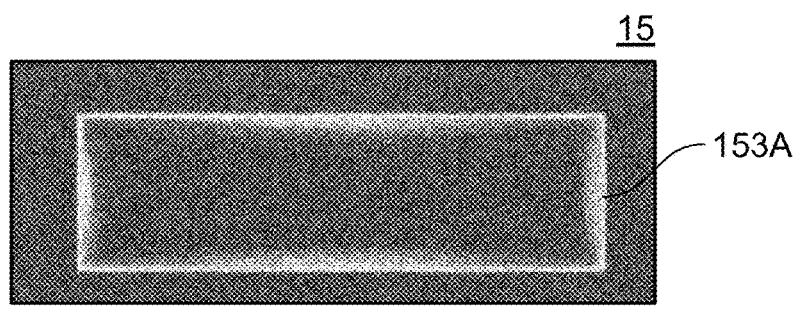
FIG. 8C is a diagram illustrating the cursor.
Figure 8D:
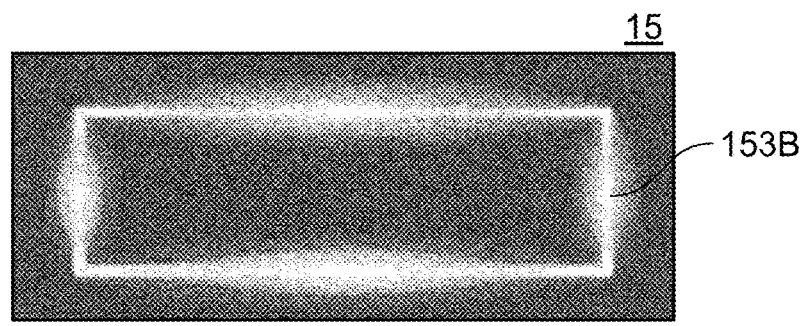
FIG. 8D is a diagram illustrating the cursor.

FIG. 8C and FIG. 8D respectively illustrate cursors 153A, 153B having a frame shape, as modification examples of the cursors 151A, 151B illustrated in FIG. 8A and FIG. 8B. The cursors 153A, 153B having a frame shape are suitably displayed for, for example, each rectangular GUI button 142 illustrated in FIG. 6A and FIG. 6B.

The cursor 153A that is not highlighted as illustrated in FIG. 8C is displayed in a state in which the operative input is not being performed on the touchpad 16A. The cursor 153A is switched to the cursor 153B that is highlighted as illustrated in FIG. 8D, in a state in which the operative input is being performed on the touchpad 16A. The brightness of the cursor 153B is increased at the center portion of each of four edges of the frame shape. The cursor 153B is displayed with microbubbles.

As described heretofore, the vehicular input device 100 keeps the cursor 150 displayed in a state in which the operative input is not being performed on the touchpad 16A. Thus, when the user moves the hand or the fingertip away from the touchpad 16A, moves the line of sight from the display panel 15, and then, views the display panel 15 again, the cursor 150 is present in a position before the user moves the line of sight from the display panel 15.

Accordingly, the user can recognize the cursor 150 again in a short time period, and the possibility of losing the cursor 150 out of sight is significantly decreased, compared to when the cursor is not displayed as in a device in the related art.

The vehicular input device 100 highlights the cursor 150 when the operative input is performed on the touchpad 16A. Thus, the user can easily recognize the cursor 150 that is highlighted by the operative input performed by the user. In addition, since the cursor 150 is not highlighted at all times unlike the device in the related art, the user easily recognizes the entire display of the display panel 15 promptly.

According to the embodiment described heretofore, the vehicular input device 100 that enables the cursor 150 to be promptly recognized while the entire display is easily recognized, and a method of controlling a vehicular input device can be provided. In addition to the cursor 150, the GUI buttons 140 and the like on which the cursor 150 is overlaid can also be promptly recognized.

Such an effect is not limited to the cursor 150. The same effect is achieved with the cursors 151A, 151B, 152A, 152B, 153A, 153B.

While the cursor 150 and the like are highlighted by changing the transparency of the cursor 150 and the like in the description, the cursor 150 and the like may be highlighted at the time of the operative input by changing the color, the brightness, or the contrast of the cursor 150 and the like instead of changing the transparency or in addition to changing the transparency.

While the animation of microbubbles is displayed as an animation in the description, the animation may be other than microbubbles.

While the vehicular input device and the method of controlling a vehicular input device according to the exemplary embodiment of the present disclosure are described heretofore, the present disclosure is not limited to the specifically disclosed embodiment. Various modifications or changes can be made to an extent not departing from the claims.

What is claimed is:

1. A vehicular input device comprising:
    a position detection unit that is disposed within a vehicle cabin, has an operative input surface on which a user performs an operative input, and is configured to detect a position of the operative input performed on the operative input surface;
    a display unit that is disposed within the vehicle cabin; and
    an electronic control unit configured to
        display a selection image on the display unit in an overlaid manner on an object that is in a position corresponding to the position of the operative input detected by the position detection unit within the display unit, the selection image being an image used to select any one of a plurality of objects displayed within the display unit, and highlight the selection image displayed on the display unit when the position of the operative input is detected by the position detection unit, further than when the position of the operative input is not detected by the position detection unit, wherein the selection image is a cursor that indicates that the object is selected, and wherein the electronic control unit is configured to highlight the selection image displayed on the display unit by displaying a predetermined animation inside the selection image.

2. The vehicular input device according to claim 1, wherein the electronic control unit is configured to highlight the selection image displayed on the display unit by changing transparency, color, brightness, or contrast of the selection image.

3. The vehicular input device according to claim 1, wherein the electronic control unit is configured to highlight the selection image displayed on the display unit while maintaining a size of the selection image to be constant.

4. The vehicular input device according to claim 1, wherein the position detection unit is a touchpad, and the display unit is a display.

5. A method of controlling a vehicular input device including a position detection unit that is disposed within a vehicle cabin, has an operative input surface on which a user performs an operative input, and is configured to detect a position of the operative input performed on the operative input surface, a display unit that is disposed within the vehicle cabin, and an electronic control unit configured to display a selection image in an overlaid manner on an object within the display unit that is in a position corresponding to the position of the detected operative input when the position detection unit detects the operative input, the selection image being used to select the object within the display unit, the method comprising:

by the electronic control unit, highlighting the selection image displayed on the display unit when the position of the operative input is detected by the position detection unit, further than when the position of the operative input is not detected by the position detection unit, wherein the selection image is a cursor that indicates that the object is selected, and wherein the electronic control unit is configured to highlight the selection image displayed on the display unit by displaying a predetermined animation inside the selection image.

6. The method according to claim 5, wherein in the highlighting, highlighting the selection image displayed on the display unit by changing transparency, color, brightness, or contrast of the selection image.

7. The method according to claim 5, wherein in the highlighting, highlighting the selection image displayed on the display unit while maintaining a size of the selection image to be constant.

8. A vehicular input device comprising:

a position detection unit that is disposed within a vehicle cabin, has an operative input surface on which a user performs an operative input, and is configured to detect a position of the operative input performed on the operative input surface;

a display unit that is disposed within the vehicle cabin; and an electronic control unit configured to display a selection image on the display unit in an overlaid manner on an object that is in a position corresponding to the position of the operative input detected by the position detection unit within the display unit, the selection image being an image used to select any one of a plurality of objects displayed within the display unit, and highlight the selection image displayed on the display unit at a first intensity level or a second intensity level, the first intensity level being greater than the second intensity level, wherein the first intensity level is selected when the position of the operative input is detected by the position detection unit, and the second intensity level is selected when the position of the operative input is not detected by the position detection unit; and the first intensity level and the second intensity level indicate level of transparency color, brightness or contrast of the selection image, wherein the selection image is a cursor that indicates that the object is selected, and wherein the electronic control unit is configured to highlight the selection image displayed on the display unit by displaying a predetermined animation inside the selection image.

9. A vehicular input device comprising:

a position detection unit that is disposed within a vehicle cabin, has an operative input surface on which a user performs an operative input, and is configured to detect a position of the operative input performed on the operative input surface;

a display unit that is disposed within the vehicle cabin; and an electronic control unit configured to display a selection image on the display unit in an overlaid manner on an object that is in a position corresponding to the position of the operative input detected by the position detection unit within the display unit, the selection image being an image used to select any one of a plurality of objects displayed within the display unit, and highlight the selection image displayed on the display unit when the position of the operative input is detected by the position detection unit, further than when the position of the operative input is not detected by the position detection unit wherein the electronic control unit is configured to display the selection image with a different color from the object in a position overlapping with an entirety of the object and display the selection image such that transparency of the selection image, with which the object is seen through the selection image, is lower in an end portion of the selection image than in a center portion of the selection image.

10. A method of controlling a vehicular input device including a position detection unit that is disposed within a vehicle cabin, has an operative input surface on which a user performs an operative input, and is configured to detect a position of the operative input performed on the operative input surface, a display unit that is disposed within the vehicle cabin, and an electronic control unit configured to display a selection image in an overlaid manner on an object within the display unit that is in a position corresponding to the position of the detected operative input when the position detection unit detects the operative input, the selection image being used to select the object within the display unit, the method comprising:

by the electronic control unit, highlighting the selection image displayed on the display unit when the position of the operative input is detected by the position detection unit, further than when the position of the operative input is not detected by the position detection unit, wherein in the displaying, displaying the selection image with a different color from the object in a position overlapping with an entirety of the object and display the selection image such that transparency of the selection image with which the object is seen through is lower in an end portion of the selection image than in a center portion of the selection image.

\* \* \* \* \*